(12) United States Patent
Nomoto et al.

(10) Patent No.: US 11,581,715 B2
(45) Date of Patent: Feb. 14, 2023

(54) CORRUGATED TUBE MOUNTING STRUCTURE

(71) Applicant: Yazaki Corporation, Tokyo (JP)

(72) Inventors: Takashi Nomoto, Aichi (JP); Katsuya Yoshimura, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/454,653

(22) Filed: Nov. 12, 2021

(65) Prior Publication Data

US 2022/0158427 A1 May 19, 2022

(30) Foreign Application Priority Data

Nov. 16, 2020 (JP) .............................. JP2020-190321

(51) Int. Cl.
*H02G 3/04* (2006.01)

(52) U.S. Cl.
CPC ................................ *H02G 3/0468* (2013.01)

(58) Field of Classification Search
CPC ..................... H02G 3/0633; H02G 3/04; B60R 2021/01272; B60R 21/01516; B60R 21/0155; B60R 21/01556; B60R 22/18; B60R 16/0215

See application file for complete search history.

(56) References Cited

U.S. PATENT DOCUMENTS

| 4,125,238 A * | 11/1978 | Tanaka | H02G 3/0633 16/2.5 |
| 4,911,510 A * | 3/1990 | Jenkins | H02G 3/0608 439/31 |
| 4,970,351 A * | 11/1990 | Kirlin | H02G 3/0406 174/136 |
| 5,208,427 A * | 5/1993 | Couto | H02G 15/04 174/653 |
| 5,257,763 A * | 11/1993 | Nakamura | H02G 3/083 248/74.1 |
| 5,277,227 A * | 1/1994 | Bradshaw | F16L 57/06 138/121 |
| 6,034,329 A * | 3/2000 | Kawamura | B60R 16/0215 174/136 |

(Continued)

FOREIGN PATENT DOCUMENTS

| JP | 2003-153411 A | 5/2003 |
| JP | 2004-72932 A | 3/2004 |

(Continued)

*Primary Examiner* — Krystal Robinson
(74) *Attorney, Agent, or Firm* — Sughrue Mion, PLLC

(57) ABSTRACT

A corrugated tube mounting structure includes: a corrugated tube into which an electric wire is inserted, formed with a slit into which the electric wire can be inserted, the slit being formed along a length direction of the corrugated tube; and a protector includes a main body inside which the electric wire is arranged and an outlet portion from which the electric wire is drawn out. The outlet portion is provided with a cover configured to close an opening into which the corrugated tube can be inserted. The cover is provided with a pressing portion configured to press the electric wire, which is exposed from an end of the corrugated tube on a main body side, toward the inside of the corrugated tube.

2 Claims, 3 Drawing Sheets

(56) References Cited

U.S. PATENT DOCUMENTS

| | | | | |
|---|---|---|---|---|
| 6,100,467 | A * | 8/2000 | Kroulik | H01R 9/11 174/15.1 |
| 6,274,813 | B1 * | 8/2001 | Houte | H02G 15/1813 428/36.5 |
| 6,878,879 | B2 * | 4/2005 | Takahashi | H02G 3/0437 174/72 A |
| 7,038,133 | B2 * | 5/2006 | Arai | H02G 3/0418 174/99 R |
| 7,109,421 | B2 * | 9/2006 | Sekino | H02G 3/34 174/72 A |
| 7,151,224 | B2 * | 12/2006 | Kogure | B60R 16/0215 174/72 A |
| 7,312,407 | B2 * | 12/2007 | Case | H02G 3/383 285/179 |
| 7,388,149 | B2 * | 6/2008 | Doherty | H02G 9/065 174/21 JS |
| 7,645,938 | B2 * | 1/2010 | Kogure | H02G 11/006 174/72 A |
| 7,901,240 | B2 * | 3/2011 | Jackson | H01R 4/5025 439/465 |
| 8,124,887 | B2 * | 2/2012 | Suzuki | H02G 3/0691 174/72 A |
| 8,575,487 | B2 * | 11/2013 | Agusa | B60R 16/0215 174/72 A |
| 9,490,614 | B2 * | 11/2016 | Klein | H02G 3/0437 |
| 9,963,092 | B2 * | 5/2018 | Uno | H02G 11/003 |
| 10,483,735 | B1 * | 11/2019 | Gretz | H02G 3/0481 |
| 10,873,178 | B2 * | 12/2020 | Tokuyama | H02G 3/0418 |
| 11,351,937 | B2 * | 6/2022 | Onodera | H02G 3/0468 |
| 2005/0092511 | A1 * | 5/2005 | Sekino | H02G 11/006 174/72 A |
| 2005/0217888 | A1 * | 10/2005 | Arai | H02G 3/0418 174/72 A |
| 2006/0219423 | A1 * | 10/2006 | Suzuki | B60R 16/0215 174/72 A |
| 2011/0132638 | A1 * | 6/2011 | Oga | B60R 16/0215 174/135 |
| 2011/0290522 | A1 * | 12/2011 | Sekino | B60N 2/0715 174/68.3 |
| 2012/0024561 | A1 * | 2/2012 | Sekino | H02G 11/00 174/50 |
| 2013/0068522 | A1 * | 3/2013 | Ogawa | H02G 3/0406 174/72 A |
| 2013/0146354 | A1 * | 6/2013 | Shimada | H01B 17/38 174/72 A |
| 2014/0090886 | A1 * | 4/2014 | Okuhara | H01B 7/1815 174/72 A |
| 2015/0014017 | A1 * | 1/2015 | Sugimoto | B60R 16/0215 174/68.3 |
| 2015/0294768 | A1 * | 10/2015 | Sakaki | H01B 13/012 174/72 A |
| 2017/0229850 | A1 * | 8/2017 | Takagi | H02G 3/0691 |
| 2018/0233887 | A1 | 8/2018 | Suzuki et al. | |
| 2019/0123530 | A1 * | 4/2019 | Tokuyama | H02G 3/0468 |
| 2019/0123531 | A1 * | 4/2019 | Yoshimura | H02G 3/0691 |
| 2020/0389003 | A1 * | 12/2020 | Kobayashi | H02G 3/22 |
| 2021/0273433 | A1 | 9/2021 | Aimu | |

FOREIGN PATENT DOCUMENTS

| | | |
|---|---|---|
| JP | 2012-005217 A | 1/2012 |
| JP | 2018-129987 A | 8/2018 |
| WO | 2019/093264 A1 | 5/2019 |

* cited by examiner

US 11,581,715 B2

CORRUGATED TUBE MOUNTING STRUCTURE

CROSS REFERENCE TO RELATED APPLICATIONS

The present application claims priority to Japanese Patent Application No. 2020-190321 filed on Nov. 16, 2020, the entire contents of which are incorporated by reference herein.

BACKGROUND

Technical Field

The present invention relates to a corrugated tube mounting structure.

Related Art

A conventional corrugated tube mounting structure includes a corrugated tube in which an electric wire is inserted. The corrugated tube is formed with a slit into which the electric wire can be inserted. The slit is formed along the length direction of the corrugated tube. This corrugated tube mounting structure includes a protector having a main body inside which an electric wire is arranged. A corrugated tube is attached to an outlet of the main body from which the electric wire is drawn out (see JP 2012-5217 A (Patent Literature 1)).

The corrugated tube mounting structure includes a first lid body as a cover for closing an opening into which a corrugated tube can be inserted. The first lid body is provided at an outlet portion of the protector.

In the corrugated tube mounting structure as described above, the corrugated tube is attached to the outlet portion by arranging the corrugated tube at the opening of the outlet portion of the protector and closing the opening of the outlet portion with the first lid body.

SUMMARY

In the corrugated tube mounting structure as described in Patent Literature 1, the slit into which an electric wire can be inserted is formed in the corrugated tube along the length direction. Therefore, when the corrugated tube is attached to the outlet portion, depending on the shape of the main body of the protector, there is a possibility that the electric wire may unexpectedly protrude into the slit and be sandwiched (bitten) with the slit.

The present invention has been made in view of such problems as described above. It is an object of the present invention to provide a corrugated tube mounting structure capable of preventing an electric wire from being sandwiched (bitten) with a slit.

A corrugated tube mounting structure according to the present embodiment includes: a corrugated tube into which an electric wire is inserted, formed with a slit into which the electric wire can be inserted, the slit being formed along a length direction of the corrugated tube; and a protector includes a main body inside which the electric wire is arranged and an outlet portion from which the electric wire is drawn out; wherein the outlet portion is provided with a cover configured to close an opening into which the corrugated tube can be inserted, the cover is provided with a pressing portion configured to press the electric wire, which is exposed from an end of the corrugated tube on a main body side, toward the inside of the corrugated tube.

The cover may include a first cover and a second cover, the first cover being arranged on an outer periphery of the corrugated tube, the second cover being arranged on an outer periphery of the electric wire. The pressing portion may be provided on the first cover. The second cover may be disposed such that the second cover overlaps with an outer surface of the pressing portion.

According to the present invention, it is possible to provide a corrugated tube mounting structure capable of preventing an electric wire from being sandwiched (bitten) with a slit.

DESCRIPTION OF EMBODIMENTS

Figure 1:
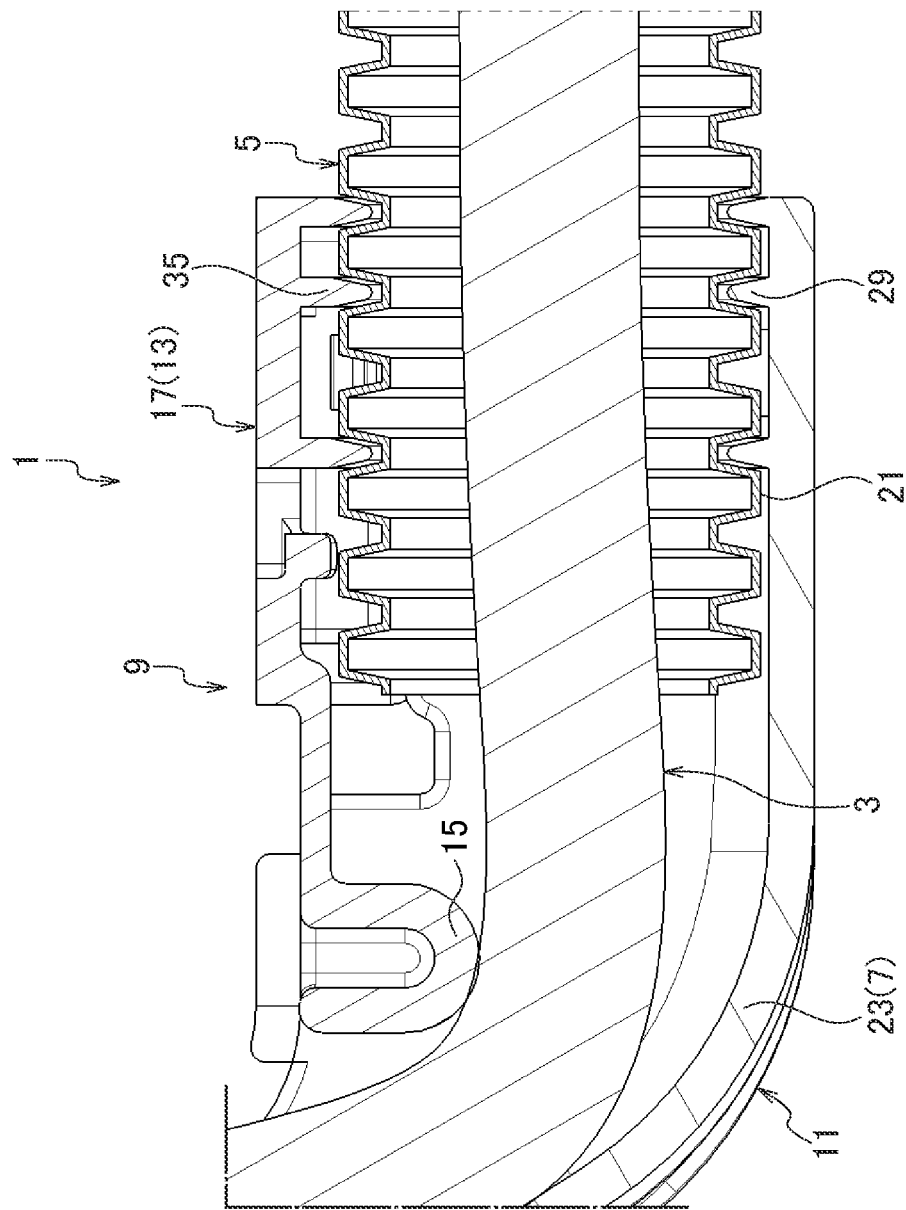
FIG. 1 is an enlarged sectional view illustrating a main part of a corrugated tube mounting structure according to the present embodiment.
Figure 2:
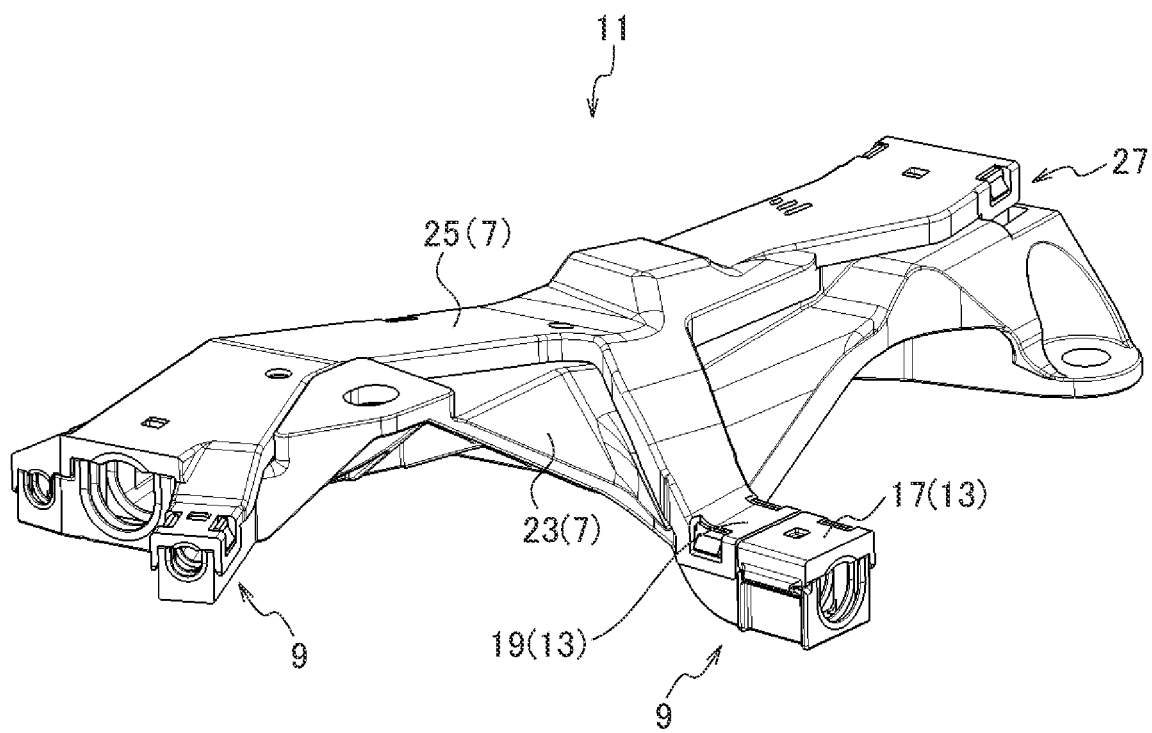
FIG. 2 is a perspective view illustrating a protector of the corrugated tube mounting structure according to the present embodiment.
Figure 3:
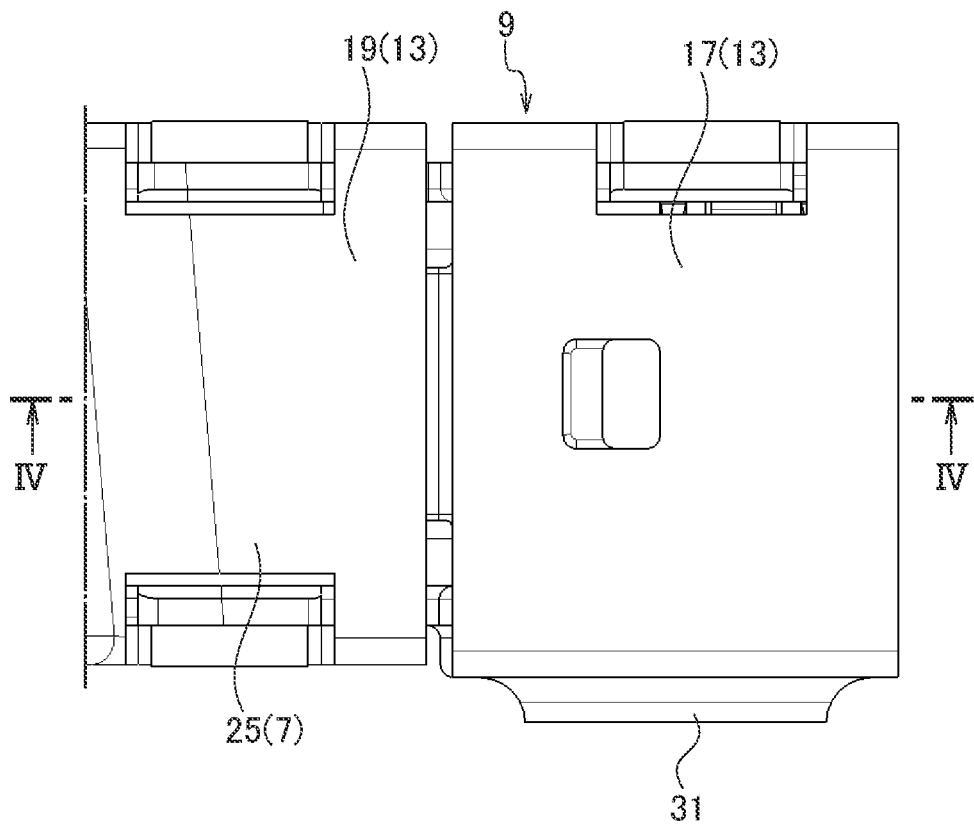
FIG. 3 is an enlarged top view illustrating a main part of the protector of the corrugated tube mounting structure according to the present embodiment.
Figure 4:
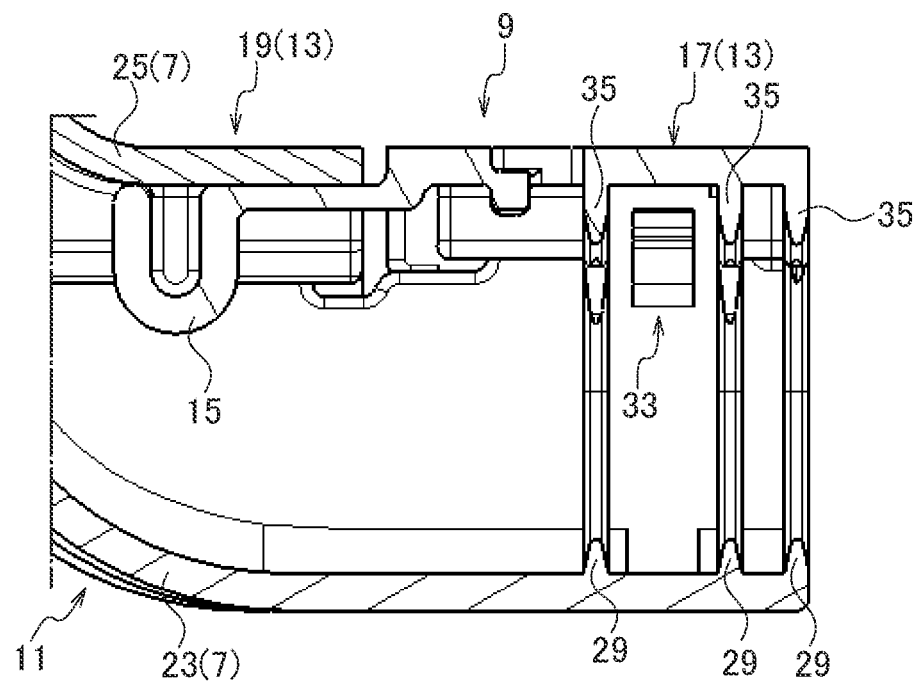
FIG. 4 is a IV-IV cross-sectional view of FIG. 3.

Hereinafter, a corrugated tube mounting structure according to the present embodiment will be described in detail with reference to drawings. Note that a dimension ratio in the drawings is exaggerated for convenience of explanation, and may differ from the actual ratio.

The corrugated tube mounting structure 1 according to the present embodiment includes a corrugated tube 5 into which an electric wire 3 is inserted. The corrugated tube 5 is formed with a slit into which the electric wire 3 can be inserted. The slit is formed along a length direction of the corrugated tube 5. In addition, the corrugated tube mounting structure 1 includes a protector 11. The protector 11 includes: a main body 7 inside which the electric wire 3 is arranged; and an outlet portion 9 from which the electric wire 3 is drawn out. The corrugated tube 5 is attached to the outlet portion 9.

The outlet portion 9 is provided with a cover 13 for closing an opening into which the corrugated tube 5 can be inserted.

The cover 13 is provided with a pressing portion 15. The pressing portion 15 presses the electric wire 3, which is exposed from an end of the corrugated tube 5 on the main body 7 side, toward the inside of the corrugated tube 5.

The cover 13 includes a first cover 17 and a second cover 19. The first cover 17 is arranged on the outer periphery of the corrugated tube 5. The second cover 19 is arranged on the outer periphery of the electric wire 3. Further, the pressing portion 15 is provided on the first cover 17. The second cover 19 is disposed such that it overlaps with the outer surface of the pressing portion 15.

As shown in FIGS. 1 to 4, the corrugated tube mounting structure 1 includes the corrugated tube 5 and the protector 11.

As shown in FIG. 1, the corrugated tube 5 has projections 21 formed along the longitudinal direction, thereby being flexible. For example, an electric wire 3 for electrically connecting a power source and an apparatus mounted on a vehicle is inserted into the corrugated tube 5 to prevent interference between the electric wire 3 and peripheral components. The electric wire 3 may be formed of a plurality of electric wires which are bundled by tape winding. The electric wire 3 may be a single electric wire, or a plurality of electric wires not tape-wound.

The corrugated tube 5 is formed with a slit (not shown) into which the electric wire 3 can be inserted. The slit extends along the length of the corrugated tube 5. By providing the slit in this manner, the corrugated tube 5 can be attached to a middle portion of the electric wire 3 even when the electric wire 3 is wired in the vehicle. The corrugated tube 5 is attached to the outlet portion 9 of the protector 11.

As shown in FIGS. 1 to 4, the protector 11 includes the main body 7 and the cover 13.

The main body 7 is made of, for example, an insulating material such as synthetic resin. The main body 7 includes a housing member 23 and a closing member 25.

The housing member 23 is formed in a gutter shape, which has an opening on one surface side such that the electric wire 3 is housed inside the housing member 23. The shape of the housing member 23 is set in accordance with the wiring form of the electric wire 3. The housing member 23 is attached to, for example, a body frame of a vehicle.

The closing member 25 is formed in a shape capable of closing the opening of the housing member 23 on the one surface side thereof. The closing member 25 is attached to the housing member 23 with a plurality of engaging portions 27 in a state where the electric wire 3 is wired inside the housing member 23, and closes the opening of the housing member 23.

The main body 7 maintains the wiring state of the electric wire 3 and prevents interference between the electric wire 3 and the peripheral member. The main body 7 is provided with outlet portions 9 from which the electric wire 3 arranged inside are led out. The corrugated tube 5 is attached to corresponding one of the outlet portions 9.

Multiple ribs 29 are provided on an inner surface of the housing member 23 constituting the outlet portion 9. Each rib 29 is engaged between adjacent projections 21 and 21 of the corrugated tube 5. Each rib 29 is engaged between the projections 21 and 21 of the corrugated tube 5 by arranging the corrugated tube 5 from the opening of the housing member 23 on one surface side thereof at the outlet portion 9.

The engagement of the rib 29 with the projections 21 and 21 prevents the corrugated tube 5 from coming off from the outlet portion 9. The opening of the housing member 23 on one side thereof in the outlet portion 9 is closed with the cover 13 after the corrugated tube 5 is arranged to the outlet portion 9 through the opening.

As shown in FIGS. 1 to 4, the cover 13 includes the first cover 17 and the second cover 19.

The first cover 17 is provided integrally with the housing member 23 via a hinge 31 at the outlet portion 9 to be opened and closed. By locking the first cover 17 with the locking portion 33, a state where the opening of the housing member 23 is closed is maintained.

On the inner surface of the first cover 17, multiple ribs 35 are provided to be engaged between adjacent projections 21 and 21 of the corrugated tube 5. Each rib 35 is engaged between the adjacent projections 21 and 21 of the corrugated tube 5 when closing the first cover 17 in a state where the corrugated tube 5 is arranged at the outlet portion 9. By the engagement of each rib 35 between the adjacent projections 21 and 21, the corrugated tube 5 is attached to the outlet portion 9, and the corrugated tube 5 is prevented from coming off from the outlet portion 9.

For example, it is assumed that the slit faces the opening of the housing member 23 in a state where the corrugated tube 5 has been attached to the outlet portion 9. Further, it is assumed that the arranged electric wire 3 is tilted toward the opening of the housing member 23 when viewed from the outlet portion 9 toward the main body 7.

Under such conditions, the electric wire 3 may protrude from the slit of the corrugated tube 5, and the electric wire 3 may be sandwiched (bitten) with the slit. Therefore, in the present embodiment, the first cover 17 includes the pressing portion 15 to prevent the electric wire 3 from being sandwiched (bitten) with the slit.

The pressing portion 15 extends from the first cover 17 toward the main body 7 of the protector 11 and is continuous with the first cover 17. The pressing portion 15 and the first cover 17 are formed as a single member. The pressing portion 15 is formed in a rib shape which projects toward the inside of the housing member 23. The pressing portion 15 is arranged at a portion where the outer periphery of the electric wire 3 exposed from the end of the corrugated tube 5 on the main body 7 side is positioned.

The pressing portion 15 presses the outer periphery of the wire 3 toward the inside of the corrugated tube 5 while the first cover 17 is closed. By pressing the electric wire 3 with the pressing portion 15, the electric wire 3 does not protrude from the slit of the corrugated tube 5. Accordingly, it is possible to prevent the electric wire 3 from being sandwiched (bitten) with the slit. The second cover 19 is disposed on the outer surface side of the pressing portion 15.

The second cover 19 is continuous with the closing member 25, and they are formed as a single member. The second cover 19 is disposed to overlap the outer surface of the pressing portion 15 by attaching the closing member 25 to the housing member 23 while the first cover 17 is closed.

With arranging the second cover 19 in this manner, the pressing portion 15 does not move in an opposite direction to the pressing direction of the pressing portion 15 even if external force, which is the opposite direction to the pressing direction, is applied to the pressing portion 15. Thus, the pressing portion 15 can stably press the electric wire 3, and it is possible to stably prevent the electric wire 3 from being sandwiched (bitten) with the slit.

The corrugated tube mounting structure 1 is assembled as follows. First, the electric wire 3 is wired to the housing member 23 of the protector 11, and the electric wire 3 is drawn out from the outlet portion 9. Next, the corrugated tube 5 is set to the electric wire 3, and the corrugated tube 5 is arranged at the outlet portion 9.

Next, the first cover 17 is attached to the housing member 23 to be closed. At this time, the electric wire 3 is pressed by the pressing portion 15. The closing member 25 is attached to the housing member 23, the second cover 19 is arranged to overlap the pressing portion 15, and the pressing of the pressing portion 15 is held to complete the assembling.

In the corrugated tube mounting structure 1, the cover 13 is provided with the pressing portion 15, which presses the electric wire 3 exposed from the end of the corrugated tube 5 on the main body 7 side toward the inside of the corrugated tube 5.

Thus, the electric wire 3 does not protrude into the slit of the corrugated tube 5, and it is possible to prevent the electric wire 3 from being sandwiched (bitten) with the slit.

In other words, according to the corrugated tube mounting structure 1, it is possible to prevent the electric wire 3 from being sandwiched (bitten) with the slit.

The cover 13 includes: the first cover 17 arranged on the outer periphery of the corrugated tube 5; and the second cover 19 arranged on the outer periphery of the electric wire 3. Further, the pressing portion 15 is provided on the first cover 17. The second cover 19 is disposed to overlap with the outer surface of the pressing portion 15.

Therefore, the pressing portion 15 does not move in the direction opposite to the pressing direction, even if an external force in the direction opposite to the pressing direction is applied to the pressing portion 15. Accordingly, the pressing portion 15 can stably press the electric wire 3, and it is possible to prevent the electric wire 3 from being sandwiched (bitten) with the slit.

The present invention is not limited to the present embodiment as described above, and various modifications can be made within the scope thereof.

For example, the cover may be formed as a single member continuous with the closing member.

The pressing portion may be provided on the second cover. In this case, the first cover is preferably disposed to overlap the outer surface of the pressing portion.

Further, the cover may be formed separately from the protector and assembled to the protector.

What is claimed is:

1. A corrugated tube mounting structure comprising:
    a corrugated tube into which an electric wire is inserted, formed with a slit into which the electric wire can be inserted, the slit being formed along a length direction of the corrugated tube; and
    a protector that includes a main body inside which the electric wire is arranged and an outlet portion from which the electric wire is drawn out; wherein
    the outlet portion is provided with a cover configured to close an opening into which the corrugated tube can be inserted,
    the cover is provided with a pressing portion configured to press the electric wire, which is exposed from an end of the corrugated tube on a main body side, toward the inside of the corrugated tube,
    the cover includes a first cover and a second cover,
    the pressing portion is provided on the first cover, and
    the second cover is disposed such that the second cover overlaps with an outer surface of the pressing portion.

2. The corrugated tube mounting structure according to claim 1, wherein
    the first cover is arranged on an outer periphery of the corrugated tube, and the second cover is arranged on an outer periphery of the electric wire.

* * * * *